US006967567B1

(12) United States Patent
Hashimoto

(10) Patent No.: US 6,967,567 B1
(45) Date of Patent: Nov. 22, 2005

(54) VEHICLE AND SYSTEM FOR CONTROLLING RETURN AND RETRIEVAL OF THE SAME

(75) Inventor: Hideki Hashimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/566,210

(22) Filed: May 5, 2000

(30) Foreign Application Priority Data

May 7, 1999 (JP) ................................ 11-127788

(51) Int. Cl.[7] ................................................ B60Q 1/00

(52) U.S. Cl. .............................. 340/425.5; 340/426.1; 340/5.6; 340/5.21; 340/309.16; 180/287

(58) Field of Search ............................ 340/425.5, 426, 340/5.22, 825.31, 5.1, 825.32, 5.2, 5.3, 8, 340/5.6, 309.16, 426.1; 180/287, 288; 307/10.2, 307/10.51, 10.52, 10.4; 70/237; 379/144; 455/407; 235/380, 382, 382.5, 384; 701/22, 701/200; 705/13

(56) References Cited

U.S. PATENT DOCUMENTS 1,223,258 A 4/1917 Cooper
3,624,608 A 11/1971 Altman et al.
3,655,397 A 4/1972 Di Napoli et al.
3,742,453 A 6/1973 Polylo
3,754,122 A 8/1973 Di Napoli et al.
3,757,290 A 9/1973 Ross
3,858,775 A 1/1975 Haas
3,906,447 A * 9/1975 Crafton ..................... 235/382
3,997,044 A 12/1976 Schasser
4,072,859 A 2/1978 McWaters
4,353,055 A 10/1982 Kawakatsu et al.
4,360,875 A 11/1982 Behnke
4,392,133 A 7/1983 Lundgren
4,438,426 A * 3/1984 Adkins ...................... 307/10.5
4,495,484 A 1/1985 Kawakatsu et al.
4,620,429 A * 11/1986 Quillen .................... 235/382.5
4,692,762 A * 9/1987 Lewiner et al. ........ 340/825.69
4,719,460 A 1/1988 Takeuchi et al.
4,776,003 A * 10/1988 Harris ........................ 379/91
4,777,646 A * 10/1988 Harris ........................ 379/91
4,994,714 A 2/1991 Hoekman et al.
5,066,034 A 11/1991 Carr
5,168,451 A 12/1992 Bolger
5,206,643 A 4/1993 Eckelt
5,265,006 A 11/1993 Asthana et al.
5,289,369 A 2/1994 Hirshberg
5,337,046 A 8/1994 Grasset
5,357,143 A 10/1994 Lehr et al.

(Continued)

FOREIGN PATENT DOCUMENTS

CA 2 227 664 7/1998

(Continued)

OTHER PUBLICATIONS

European Patent Office Search Report of 01305580.1-2215, Nov. 7, 2001, 2 pages.

(Continued)

*Primary Examiner*—Davetta W. Goins
(74) *Attorney, Agent, or Firm*—Fish & Richardson P.C.

(57) ABSTRACT

The vehicle of the present invention, which has doors that lock and is moved, based on personal identification, comprises: a device for preventing moving of the vehicle based on the personal identification when receiving a return instruction from a vehicle user; and a device for allowing only the operation of the doors for a predetermined period of time after the return instruction.

17 Claims, 3 Drawing Sheets

U.S. PATENT DOCUMENTS

| | | | | |
|---|---|---|---|---|
| 5,366,338 | A | 11/1994 | Mortensen | |
| 5,493,694 | A | 2/1996 | Vlcek et al. | |
| 5,557,254 | A | 9/1996 | Johnson et al. | |
| D374,208 | S | 10/1996 | Eva, Jr. | |
| 5,579,973 | A | 12/1996 | Taft | |
| 5,604,676 | A | 2/1997 | Penzias | |
| 5,612,608 | A | 3/1997 | Ishiguro et al. | |
| 5,614,804 | A | 3/1997 | Kayano et al. | |
| 5,664,113 | A | 9/1997 | Worger et al. | |
| 5,686,895 | A | 11/1997 | Nakai et al. | |
| 5,717,387 | A * | 2/1998 | Suman et al. | 340/825.31 |
| 5,721,550 | A | 2/1998 | Lopez | |
| 5,726,885 | A * | 3/1998 | Klein et al. | 364/423.098 |
| 5,737,710 | A | 4/1998 | Anthonyson | |
| 5,751,973 | A | 5/1998 | Hassett | |
| 5,790,976 | A | 8/1998 | Boll et al. | |
| 5,793,306 | A | 8/1998 | Vershinin et al. | |
| 5,803,215 | A | 9/1998 | Henze et al. | |
| 5,812,070 | A * | 9/1998 | Tagami et al. | 340/932.2 |
| 5,838,251 | A * | 11/1998 | Brinkmeyer et al. | 340/825.31 |
| 5,869,950 | A | 2/1999 | Hoffman, Jr. et al. | |
| 5,908,453 | A | 6/1999 | Tabata et al. | |
| 5,922,040 | A | 7/1999 | Prabhakaran | |
| 5,945,919 | A | 8/1999 | Trask | |
| 5,995,013 | A * | 11/1999 | Yoshizawa et al. | 340/825.31 |
| 5,995,898 | A | 11/1999 | Tuttle | |
| 6,078,850 | A | 6/2000 | Kane et al. | |
| 6,089,431 | A | 7/2000 | Heyworth | |
| 6,129,371 | A | 10/2000 | Powell | |
| 6,133,707 | A | 10/2000 | Kikuchi et al. | |
| 6,154,006 | A | 11/2000 | Hatanaka et al. | |
| 6,157,315 | A | 12/2000 | Kokubo et al. | |
| 6,181,991 | B1 | 1/2001 | Kondo et al. | |
| 6,185,487 | B1 | 2/2001 | Kondo et al. | |
| 6,185,501 | B1 | 2/2001 | Smith et al. | |
| 6,225,890 | B1 | 5/2001 | Murphy | |
| 6,240,365 | B1 * | 5/2001 | Bunn | 701/213 |
| 6,249,233 | B1 | 6/2001 | Rosenberg et al. | |
| 6,253,129 | B1 | 6/2001 | Jenkins et al. | |
| 6,253,980 | B1 * | 7/2001 | Murakami et al. | 22/510 |
| 6,278,936 | B1 | 8/2001 | Jones | |
| 6,304,223 | B1 | 10/2001 | Hilton et al. | |
| 6,317,720 | B1 | 11/2001 | Murakami et al. | |
| 6,336,295 | B1 | 1/2002 | Takei et al. | |
| 6,340,935 | B1 | 1/2002 | Hall | |
| 6,427,913 | B1 | 8/2002 | Maloney | |
| 6,538,560 | B1 | 3/2003 | Stobbe et al. | |
| 2003/0014302 | A1 | 1/2003 | Jablin | |

FOREIGN PATENT DOCUMENTS

| | | | |
|---|---|---|---|
| DE | 22 10 088 | | 10/1972 |
| DE | 40 24 186 | A1 | 2/1992 |
| DE | 40 32 198 | A1 | 4/1992 |
| DE | 42 27 969 | A1 | 3/1994 |
| DE | 43 01 039 | A1 | 7/1994 |
| DE | 44 29 852 | A1 | 2/1996 |
| DE | 195 08 369 | C1 | 3/1996 |
| DE | 195 08 370 | A1 | 9/1996 |
| DE | 195 21 902 | A1 | 12/1996 |
| DE | 38 05 810 | A1 | 9/1998 |
| DE | 197 28 885 | A1 | 1/1999 |
| DE | 298 11 292 | U1 | 1/1999 |
| DE | 197 40 602 | A1 | 3/1999 |
| DE | 100 33 341 | A1 | 1/2002 |
| EP | 0 147 284 | B1 | 7/1985 |
| EP | 0 212 842 | A1 | 3/1987 |
| EP | 0 323 326 | B1 | 7/1989 |
| EP | 0 433 740 | B1 | 6/1991 |
| EP | 0 451 482 | A1 | 10/1991 |
| EP | 0 509 776 | | 10/1992 |
| EP | 0 309 318 | B1 | 12/1992 |
| EP | 0 307 485 | B1 | 6/1994 |
| EP | 0 653 732 | A1 | 5/1995 |
| EP | 0 694 885 | A2 | 1/1996 |
| EP | 0 179 160 | A1 | 4/1996 |
| EP | 0 708 427 | A2 | 4/1996 |
| EP | 0704352 | A1 | 4/1996 |
| EP | 0765984 | A2 | 4/1997 |
| EP | 0 877 341 | A2 | 11/1998 |
| EP | 0 991 031 | A2 | 4/2000 |
| EP | 0 997 861 | A2 | 5/2000 |
| EP | 1 011 085 | A2 | 6/2000 |
| EP | 1 067 480 | A2 | 1/2001 |
| EP | 1 067 481 | A2 | 1/2001 |
| EP | 1 067 498 | A1 | 1/2001 |
| FR | 2 232 064 | | 12/1974 |
| FR | 2 212 064 | | 7/1979 |
| FR | 2 535 491 | | 5/1984 |
| FR | 2 625 954 | | 7/1989 |
| FR | 2 656 450 | | 6/1991 |
| FR | 2 662 285 | | 11/1991 |
| FR | 2 612 319 | | 5/1992 |
| FR | 2 692 064 | | 12/1993 |
| FR | 2 712 715 | | 5/1995 |
| FR | 2 732 144 | | 9/1996 |
| FR | 2 126 602 | | 6/1997 |
| GB | 2 146 154 | A | 4/1985 |
| GB | 2 271 081 | A | 10/1989 |
| GB | 2 291 235 | A | 2/1996 |
| JP | 11-127750 | | 3/1973 |
| JP | 04-133195 | | 5/1992 |
| JP | 05-133195 | | 5/1993 |
| JP | 08-138199 | | 5/1996 |
| JP | 10-208195 | | 8/1998 |
| JP | 10-255162 | | 9/1998 |
| JP | 10-255191 | | 9/1998 |
| JP | 10-261199 | | 9/1998 |
| JP | 10-266191 | | 9/1998 |
| JP | 11-127788 | | 5/1999 |
| JP | 11-201762 | | 7/1999 |
| JP | 2001067581 | A | 3/2001 |
| JP | 2001-67581 | | 3/2003 |
| WO | WO 84/03785 | | 9/1984 |
| WO | WO 85/01812 | | 4/1985 |
| WO | WO 92/22043 | | 12/1992 |
| WO | WO 95/21435 | | 8/1995 |
| WO | WO 99/44186 | | 9/1999 |

OTHER PUBLICATIONS

European Patent Office Search Report of 99250392, Feb. 9, 2001, 3 pages.

European Patent Office Search Report of 00305739, Oct. 20, 2000, 2 pages.

European Patent Office Search Report of 95304203, Mar. 8, 1996, 1 page.

European Patent Office Search Report of 94402568, Dec. 12, 1994, 1 page.

European Patent Office Search Report of 91102927, Jun. 13, 1991, 1 page.

European Patent Office Search Report of 86305442, Oct. 30, 1986, 3 pages.

Australian Patent Office Search Report of SG 20003722-6, Jan. 24, 2002, 4 pages.

Australian Patent Office Search Report of SG 20003721-8, Jan. 24, 2002, 2 pages.

Australian Patent Office Search Report of SG 200103958-5, Nov. 19. 2002, 2 pages.

United Kingdom Patent Office Search Report of GB9413527.4, Sep. 1994, 1 page.

French Patent Office Search Report of FR 0005779, Feb. 1, 2002, 2 pages.

French Patent Office Search Report of FR 0004270, Jun. 29, 2001, 1 page.
French Patent Office Search Report of FR 9503408, Dec. 29, 1995, 1 page.
French Patent Office Search Report of FR 94402568, Dec. 12, 1994, 1 page.
Praxitele web site=http://www-rocq.inria.fr/praxitele/welcome-angl.html?59, 31, Dec. 1997.
Bill Donahue, May 17, 2002, Cars You Drive for Just a Little While, Then It's Their Turn, New York Times, Coast), p. 10.
Matthew Barth; Aug. 1999, Stimulation Model Performance Analysis of a Multiple Station Shared Vehicle System, Transportation Research, Issue 7C, vol. 4. Pages.
"Station Car EV Could Meet State Mandates", Electric Vehicle Energy Network Online today, Aug. 31, 1995.
Tangiah, et al. "An Agent Architecture for Vehicle Routing Problems", 2001.
"Hydralift-The Art of Lifting", Hydralift USA, HLRF0721.

* cited by examiner

VEHICLE AND SYSTEM FOR CONTROLLING RETURN AND RETRIEVAL OF THE SAME

BACKGROUND OF THE INVENTION

1. Field of the Invention

The present invention relates to a vehicle and a vehicle return/retrieval control system in which doors are locked/unlocked and a main switch is turned on/off by means of an IC card, and, in particular, to a control system for returning and retrieving a vehicle which allows a user to leave the vehicle outside a specified return area, and which can smoothly retrieve the vacated vehicle.

This application is based on Japanese Patent Application No. 11-127788, the contents of which are incorporated herein by reference.

2. Description of the Related Art

Recently, environmental issues have been highlighted, and to reduce air pollution and traffic congestion, techniques have been proposed for using shared electric vehicles in a specified region. The techniques for using the shared vehicles require ports (parking lots) for renting and returning the shared vehicles. Users who have rented the vehicles can return the vehicles to the nearest ports. Until the vehicle is returned, a charge is assessed for the vehicles, depending on utilization times, driving distances, etc.

When the return of the vehicles is restricted to the ports, users must drive to the ports even if the users wishes to leave the vehicles on urgent business. If the users may leave the vehicles, which have been rented, on urgent business, a charge will be assessed for the vacated vehicles, and the cost to the vehicle user is increased.

To prevent a person other than the vehicle user from using the vehicle, a personal identification may be employed to allow only one vehicle user to lock or unlock vehicle doors and to drive the vehicle. In this case, when the user leaves the vehicle without canceling the personal identifications, even a retrieval agent cannot retrieve the vehicles.

BRIEF SUMMARY OF THE INVENTION

It is therefore an object of the present invention to provide a vehicle and a control system for returning and retrieving the same which allows a user to leave the vehicle outside a specified return area for shared vehicles, and which can reliably retrieve the vacated vehicle.

In order to accomplish the above object, the vehicle (1) which has doors that lock, and which is moved, based on personal identification, comprises: a device for preventing moving of the vehicle based on personal identification when receiving a return instruction from a vehicle user (U); and a device for allowing only the operation of the doors for a predetermined period of time after the return instruction.

According to this construction, when a user sends an instruction to return the vehicle outside a predetermined return area, e.g., to leave the vehicle, the driving of the vehicle based on the personal identification is prevented, and the vehicle cannot be moved from the point where the vehicle has been returned. Further, because only the operation of the doors is allowed for a predetermined period of time, the user can unhurriedly unload baggage when getting off the vehicle, and this is convenient for the vehicle user.

In the control system for returning and retrieving a vehicle, a return instruction is sent from the vehicle to a control device, and the control device sends a signal for canceling the personal identification.

According to this construction, when the vehicle user sends the return instruction to the control device, the user's intention to leave the vehicle is reliably sent to the control device. Because the control device cancels the personal identification, the invention can avoid the problem that the personal identification of the vehicle user remains.

Then the control device sends another different personal identification together with the signal for canceling the personal identification, and replaces the personal identification with the different personal identification.

By replacing the personal identification with another personal identification of, e.g., a retrieval agent, the vacated vehicle can be easily retrieved by the agent. When the personal identification is replaced with the personal identification of the retrieval agent, the retrieval can be more properly carried out than in the case in which a master key which allows any retrieval agent to retrieve the vehicle is used.

DETAILED DESCRIPTION OF THE INVENTION

Figure 1:
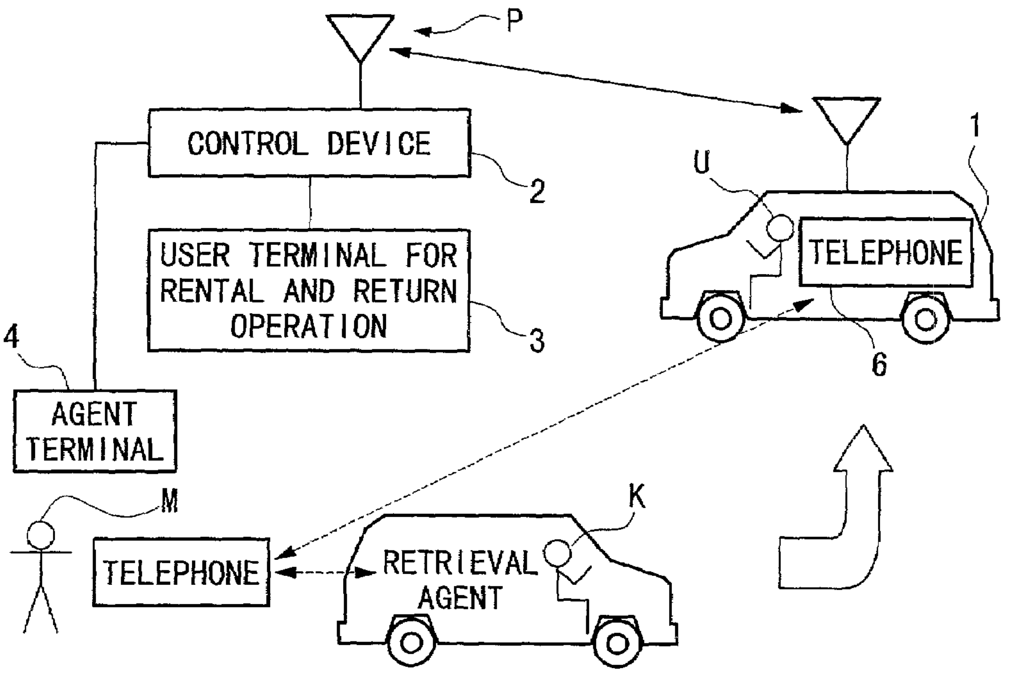
FIG. 1 is a diagram showing the entire construction of the shared vehicle system of the embodiment according to the present invention.
Figure 2:
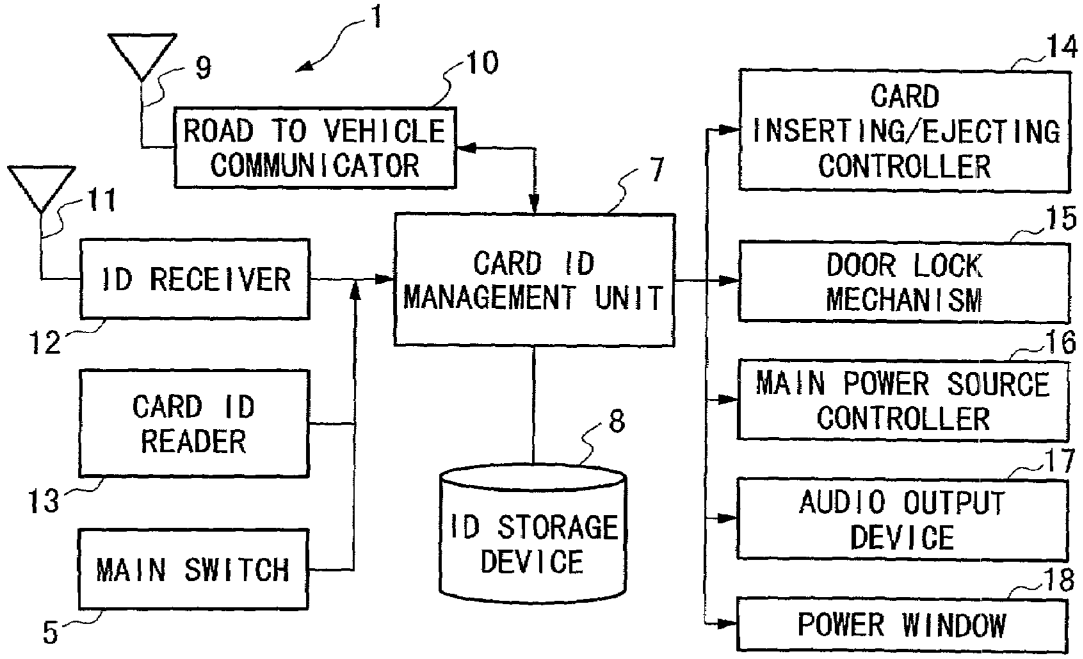
FIG. 2 is a diagram showing the construction of the vehicle of the embodiment according to the present invention.

In FIGS. 1 and 2, reference numeral 1 denotes an electric vehicle (hereinafter referred to simply as a vehicle). The vehicle 1 is not limited to an electric vehicle, and may be a gasoline vehicle, or a hybrid vehicle. The vehicle 1 drives between ports P which are parking lots for a number of vehicles. The vehicle 1 is capable of performing road to vehicle communication with a control device 2. The road to vehicle communication means the communication between the vehicle and the control device, and may be another type of radio communication. A user terminal 3 for renting and returning the vehicle 1, and an agent terminal 4 are connected to the control device 2.

When renting the vehicle 1, a vehicle user U allows the user terminal 3 to read information from a registered IC card, and then a rental procedure is started. The control device 2 transmits this information to the rental vehicle 1 via the road to vehicle communication. The vehicle user U unlocks a door using the IC card, turns on a main switch 5, and drives out of the port P.

To return the vehicle 1, when the user arrives at the port P, he turns off the main switch 5, receives the ejected IC card, locks the door using the IC card, and allows the user terminal 3 of the port P to read the information from the IC card, and then a return procedure is started. The control device 2 transmits via the road to vehicle communication an instruction to the vehicle 1, which is to be returned, to clear the ID, which makes the vehicle 1 rentable.

When the vehicle 1 is left outside the port P, the control device 2 starts the return procedure in response to a return instruction from a phone 6 in the rented vehicle 1.

At the same time, a contact agent M sends an instruction to a retrieval agent K, and then the retrieval agent K starts to retrieve the vehicle 1.

FIG. 2 shows the construction of the vehicle 1. The vehicle 1 includes a card ID management unit 7 for the IC card. An ID storage device 8 is connected to the card ID management unit 7. The card ID management unit 7 receives information from the control device 2 via a vehicle communicator 10 and a vehicle communication antenna 9. A door antenna 11 inputs door-lock or -unlock information via an ID receiver 12 to the card ID management unit 7. This input information also includes information from a card ID reader 13 and the main switch 5. The card ID management unit 7 outputs signals to a card inserting/ejecting controller 14, a door lock mechanism 15, a main power controller 16, an audio output device 17, and a power window 18.

The card ID management unit 7 operates as follows. When the ID stored in the ID storage device 8 and the ID received by the door antenna 11 are identical, the door lock mechanism 15 unlocks the door. Further, when the ID stored in the ID storage device 8 and the ID input from the card ID reader 13 are identical, and when the main switch 5 is turned on, and the main power controller 16 turns on the main power. When the main switch 5 is turned off, the card inserting/ejecting controller 14 is turned on, and the IC card is ejected.

Figure 3:
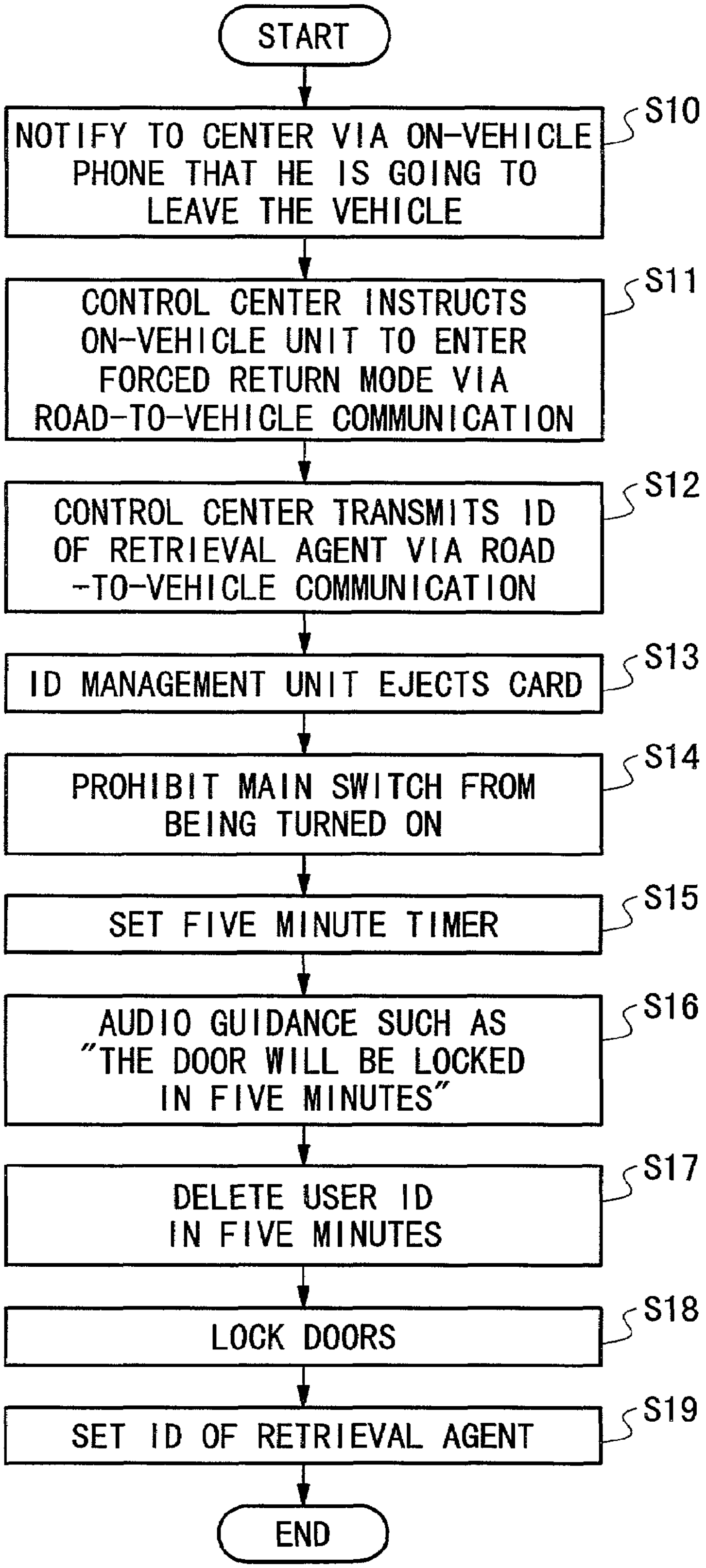
FIG. 3 is a flowchart showing the entire process of the embodiment according to the present invention.

The entire process will be explained with reference to a flowchart of FIG. 3.

When the vehicle user U wishes to leave the vehicle 1 for some reason, he notifies to the control device 2 in a center via the on-vehicle phone 6 that he is going to leave the vehicle in step S10. In step S11, the control device 2 in the center instructs the units in the vehicle 1 via the road to vehicle communication to enter a forced return mode. Thus, the control device 2 is reliably informed of the intention of the vehicle user U, and the following procedure can be smoothly performed.

In the next step S12, the control device 2 in the center transmits the ID of the retrieval agent K via the road to vehicle communication. Then, in step S13, the card ID management unit 7 ejects the card, and in the next step S14 the main power controller 16 prohibits the main switch 5 from being turned on. Therefore, when the vehicle user U tries to move the vehicle 1, the main switch 5 cannot be turned on, and the vehicle cannot be moved.

In step S15, a timer is started. This timer gives grace time of five minutes so that the vehicle user U can unload baggage. After the timer is set, in step S16 the audio output device 17 provide voice information such as "the door will be locked in ○○ minutes." Then, in step S17, after the timer set time has passed, the user ID is deleted. In step S18, the door is locked (at the same time, door windows are closed), and in step S19 the ID of the retrieval agent K is set. Because the previous ID has been replaced with the ID of the retrieval agent K, others as well as the previous vehicle user U cannot use the vehicle 1 until the retrieval agent K reaches the vehicle.

Figure 4:
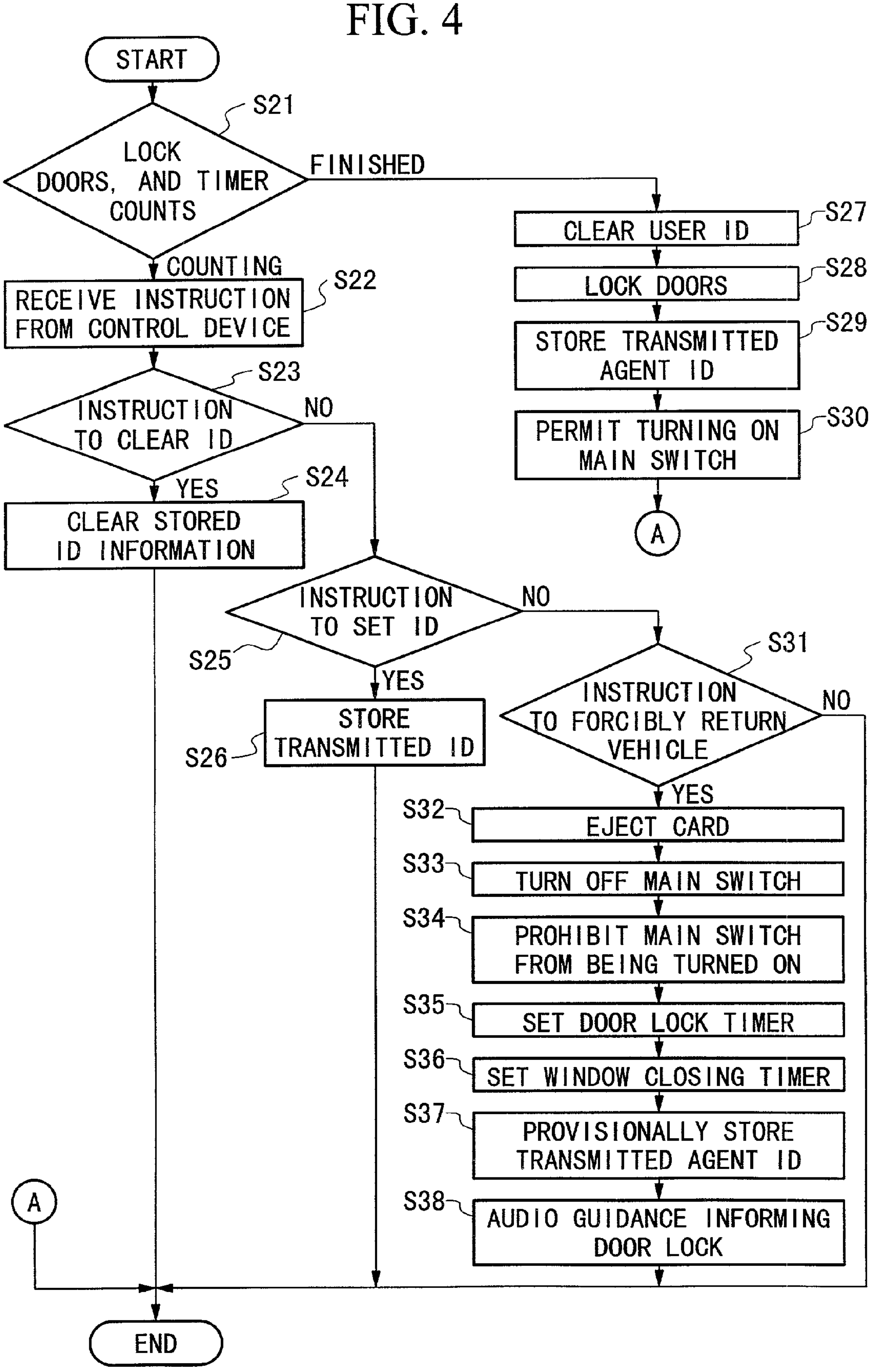
FIG. 4 is a flowchart showing the process for leaving and retrieving the vehicle of the embodiment according to the present invention.

Next, the process for retrieval carried out within the vehicle 1 according to the information transmitted from the control device 2 will be explained with reference to FIG. 4.

In step S21, it is determined whether a door lock timer is counting. When the timer is counting, an instruction from the control device 2 is received in step S22, and it is determined in step S23 whether the instruction received in step S22 is an instruction to clear the ID or not. When in step S23 the determination is "YES", that is, when it is an instruction to clear the ID, the ID information which has been stored in step S24 is cleared, and the process is completed. When in step S23 the determination is "NO", that is, when it is not an instruction to clear the ID, the flow proceeds to step S25, and then it is determined whether the instruction in step S22 is an instruction to set the ID or not.

When in step S25 the determination is "YES", that is, when it is an instruction to set the ID, the flow proceeds to step S26, and then the received ID is stored, and the process is completed. When in step S25 the determination is "NO", that is, when it is not an instruction to set the ID, the flow proceeds to step S31.

In step S31, it is determined whether the instruction received in step S22 is an instruction to forcibly return the vehicle or not. When in step S31 the determination is "NO", that is, when it is not an instruction to forcibly return the vehicle, the process is completed. When in step S31 the determination is "YES", the ID card is ejected in step S32, the main switch 5 is turned off in step S33, and the main switch 5 is prohibited from turning on in step S34. Because the main switch 5 has been turned off, when the previous vehicle user U tries to move the vehicle 1, the vehicle 1 cannot be moved, and stays at the same place until the retrieval of the vehicle.

In step S35, the door lock timer is started, and a window closing timer is started in step S36. Then, in step S37 the ID of the retrieval agent received in step S37 is provisionally stored, in step S38 the audio output device 17 provides a guidance informing that the door will be locked, and the process is completed.

When in step S21 the door lock timer has finished counting, in step S27 the user ID is cleared, in step S28 the door is locked, in step S29 the received ID of the retrieval agent K is stored in the ID storage device 8, the flow then proceeds to step S30, in step S30 the main switch is permitted to be turned on, and the process is completed.

According to the embodiment, when the vehicle user U leaves the vehicle 1 outside the port P, the user simply has to make a call using the phone 6 to return the vehicle 1, and this is convenient for the vehicle user U. Once the vehicle user U has contacted the control device, the vehicle user U cannot use and move the vehicle 1.

Therefore, when retrieving the vehicle 1, the present invention avoids a situation in which the vehicle 1 is moved from the point where the vehicle 1 has been returned and cannot be found. Further, because the door lock timer and the window closing timer give a certain amount of grace time until the door windows are closed and the vehicle 1 is locked, the user can unhurriedly get off the vehicle and unload baggage.

Further, the procedure from the notification of leaving the vehicle 1 using the phone 6 to the retrieval of the vehicle 1 by the retrieval agent K can be smoothly carried out. Therefore, the invention prevents the problem that the ID of the previous vehicle user remains and impedes the retrieval of the vehicle 1. Because, when retrieving the vehicle 1, the individual ID of the retrieval agent K has been set, the retrieval can be more properly carried out than the case in which a master key, which allows any retrieval agent to retrieve the vehicle, is used.

The present invention is not limited to the above-described embodiment, and may also be embodied in the following embodiments. In the second embodiment, a plurality of ignition keys for the rentable vehicles are accommodated in a key box, and a key manager allows only the ignition key, corresponding to the ID of the user, to be taken out when renting the vehicle. The third embodiment employs a key locker system, in a manner similar to an unmanned rental car, in which a plurality of ignition keys for the rentable vehicles are accommodated in respective key lockers, and only the key locker, corresponding to the ID of the user, can be opened to allow the user to use the key.

These embodiments limit the users when renting the ignition key so that only the specified user can lock and unlock the doors of the vehicle and can move the vehicle. Once a return button is pushed, a key certification function (immobilizer function) prohibits re-starting the engine, and allows only locking of the doors. When leaving and returning the vehicle, the user simply pushes the return button, gets off the vehicle, and locks the doors. The key used at this time may be mailed by the user to a management center. The management center moves and retrieves the vacated vehicle using a master key.

Thus, these two embodiments avoids a situation in which the vehicle is moved from the point where the vehicle 1 has been returned, and cannot be found.

In the first embodiment, the instruction to return the vehicle 1 from the vehicle user U to the control device 2 is not limited to a phone within the vehicle 1, and may be, e.g., a public telephone outside the vehicle. If, after the user has unloaded baggage from the vehicle, an urgent matter occurs during shopping, and the user must go to another place directly after shopping, the user does not have to return to the vehicle 1.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A vehicle which has doors and is operable by a user having a personal identification, comprising:

a wireless communicator communicating with a control center and configured to receive a forced return command from the control center;

a vehicle controller coupled to said wireless communicator and configured to prevent the user having the personal identification to operate the vehicle in response to receiving the forced return command from the control center; and a timing device coupled to said vehicle controller and configured for allowing only the operation of the doors for a predetermined period of time after receiving the forced return command.

2. The vehicle of claim 1, wherein said wireless communicator is further configured to transmit a vehicle return request of the user to the control center.

3. The vehicle of claim 2, wherein:

said wireless communicator is further configured to receive from the control center a second personal identification; and said vehicle controller is further configured to permit the operation of the vehicle by a second user having the second personal identification.

4. A system for controlling return and retrieval of temporarily assignable vehicles, comprising:

a wireless communicator in each of the temporarily assignable vehicles;

a vehicle management unit in each of the temporarily assignable vehicles coupled to said wireless communicator; and a central control device in radio communication with said wireless communicator, wherein:

in response to a vehicle return request transmitted from said wireless communicator indicating a user intending to leave a vehicle outside a specific return area, said central control device clears the assignment of the vehicle to the user aid transmits a forced return command to said wireless communicator; and in response to the forced return command, said vehicle management unit prevents the operation of the vehicle by the user.

5. The system of claim 4, further comprising a card reader in each of the temporarily assignable vehicles coupled to said vehicle management unit, wherein said vehicle management unit is programmed to unlock vehicle doors upon presentation at said card reader of an IC card of a user to whom the vehicle is assigned.

6. The system of claim 4, wherein:

said central control device further transmits a vehicle retrieve command with the forced return command to said wireless communicator; and said vehicle management unit permits the operation of the vehicle by a retrieving agent in response to the vehicle retrieve command.

7. The system of claim 4, wherein the assignment of vehicles is carried out as a system for rental of vehicles.

8. A system for vehicle rental, comprising:

a user terminal;

a control system;

a temporarily assignable vehicle; and a card ID management system installed in the vehicle in wireless communication with the control system, wherein:

in response to a user to whom a vehicle is temporarily assigned signaling an intention to leave the vehicle outside a specific return area, the control system reassigns the vehicle to a retrieval unit; and in response to the control system reassigning the vehicle to the retrieval unit, the card ID management system prevents further operation of the vehicle by the user.

9. A vehicle which has doors that lock and is moved, based on personal identification, comprising:

an identification device installed on the vehicle, said identification device storing personal identification and allowing moving of the vehicle when personal identification presented matches the stored personal identification and preventing moving of the vehicle by replacing the stored personal identification with different personal identification when receiving a return instruction from a vehicle user; and a timing device coupled to said identification device, said timing device allowing only operation of the doors for a predetermined period of time after the return instruction.

10. The vehicle of claim 9, wherein:

said identification device transmits the vehicle return instruction to a control device; and the control device sends a signal for canceling the stored personal identification to said identification device in response to the vehicle return instruction.

11. A vehicle return and retrieval system not requiring return of temporarily assignable vehicles to specific retrieval areas comprising:

a control system, said control system assigning a vehicle to a user; and a card ID management unit on the vehicle in radio communication with said control system, said card ID management system storing identification of the user to whom the vehicle is assigned, wherein, when the user signals an intention of leaving the vehicle outside a specific return area, said control system clears the assignment of the vehicle to the user by canceling the stored identification in said card ID management unit and assigns the vehicle to a retrieval unit by having identification of the retrieval unit stored in said card ID management unit.

12. The vehicle return and retrieval system of claim 11, further comprising a card reader and lockable doors on the vehicle and coupled to said card ID management unit, wherein said card ID management unit is programmed to unlock said lockable doors upon presentation of an IC card of the user to whom the vehicle is assigned.

13. The vehicle return and retrieval system of claim 12, further comprising a timing device coupled to said card ID management unit and allowing only operation of said lockable doors for a predetermined period of time after said control system clears the assignment of the vehicle to the user.

14. The vehicle return and retrieval system of claim 11, further comprising a wireless telephone for informing said control system that the user intends to leave.

15. The vehicle return and retrieval system of claim 11, wherein said control system carries out the assignment of vehicles as a system for rental of vehicles.

16. A vehicle rental system, comprising:

a user terminal;

a control system in communication with said user terminal;

a temporarily assignable vehicle;

an ID management system installed on said vehicle and iii wireless communication with said control system, said ID management system storing identification of a user in response to said control system assigning said vehicle to the user, and canceling the stored identification and storing identification of a retrieval unit in response to the user signaling an intention of leaving the vehicle outside a specific return area.

17. The vehicle rental system of claim 16, further comprising a timing device coupled to said ID management system and allowing only operation of vehicle doors for a predetermined period of time after said the user signaling an intention of leaving the vehicle.

* * * * *